United States Patent
Kim et al.

(10) Patent No.: US 11,349,181 B2
(45) Date of Patent: May 31, 2022

(54) BATTERY MODULE INCLUDING INSERT-INJECTION MOLDED BUSBAR ASSEMBLY

(71) Applicant: LG Chem, Ltd., Seoul (KR)

(72) Inventors: Hyejin Kim, Daejeon (KR); Hyunchul Choi, Daejeon (KR); Youngho Choi, Daejeon (KR)

(73) Assignee: LG Energy Solution, Ltd.

( * ) Notice: Subject to any disclaimer, the term of this patent is extended or adjusted under 35 U.S.C. 154(b) by 227 days.

(21) Appl. No.: 16/704,606

(22) Filed: Dec. 5, 2019

(65) Prior Publication Data
US 2020/0185682 A1 Jun. 11, 2020

(30) Foreign Application Priority Data

Dec. 7, 2018 (KR) .................. 10-2018-0157088

(51) Int. Cl.
*H01M 50/502* (2021.01)
*H01M 50/20* (2021.01)
*B29C 45/14* (2006.01)
*H01M 50/521* (2021.01)
*H01M 50/503* (2021.01)
*H01M 50/505* (2021.01)
*H01M 50/531* (2021.01)
(Continued)

(52) U.S. Cl.
CPC ............ *H01M 50/502* (2021.01); *B29C 45/14* (2013.01); *H01M 50/20* (2021.01); *H01M 50/531* (2021.01); *B29L 2031/3468* (2013.01); *B29L 2031/7146* (2013.01); *H01M 50/503* (2021.01); *H01M 50/505* (2021.01); *H01M 50/521* (2021.01)

(58) Field of Classification Search
CPC .. H01M 50/502; H01M 50/531; H01M 50/20; H01M 50/521; H01M 50/505; H01M 50/503; B29C 45/14; B29L 2031/3468; B29L 2031/7146
See application file for complete search history.

(56) References Cited

U.S. PATENT DOCUMENTS 5,053,178 A * 10/1991 Butlin ................. B29C 45/1671
264/254
9,520,510 B2  12/2016 Xue et al.
(Continued)

FOREIGN PATENT DOCUMENTS

JP    2010205509 A  *  9/2010
JP    2014022195 A     2/2014
(Continued)

OTHER PUBLICATIONS

English translation of JP-2010-205509-A obtained from Global Dossier (Year: 2010).*

*Primary Examiner* — Christopher P Domone
*Assistant Examiner* — Kimberly Wyluda
(74) *Attorney, Agent, or Firm* — Lerner, David, Littenberg, Krunholz & Mentlik, LLP

(57) ABSTRACT

A battery module includes a cell assembly including at least one battery cell; a module casing configured to accommodate the cell assembly; and a busbar assembly integrated by forming, by insert-injection molding, a busbar electrically connected to an electrode lead of the cell assembly, and a busbar frame configured to cover the cell assembly at least at one side thereof.

16 Claims, 9 Drawing Sheets

(51) Int. Cl.
B29L 31/34 (2006.01)
B29L 31/00 (2006.01)

(56) References Cited

U.S. PATENT DOCUMENTS

| | | | |
|---|---|---|---|
| 2001/0006688 A1* | 7/2001 | Soga | ............... B29C 45/14639 425/127 |
| 2018/0183020 A1 | 6/2018 | Ju et al. | |
| 2019/0348720 A1 | 11/2019 | Oh et al. | |

FOREIGN PATENT DOCUMENTS

| | | |
|---|---|---|
| JP | 5496522 B2 | 5/2014 |
| JP | 5722118 B2 | 5/2015 |
| KR | 20150067694 A | 6/2015 |
| KR | 20170021698 A | 2/2017 |
| KR | 101844852 B1 | 4/2018 |
| KR | 20180074592 A | 7/2018 |
| KR | 20180099438 A | 9/2018 |
| KR | 101928072 B1 | 12/2018 |

* cited by examiner

BATTERY MODULE INCLUDING INSERT-INJECTION MOLDED BUSBAR ASSEMBLY

CROSS-REFERENCE TO RELATED APPLICATION

The present application claims the benefit of the priority of Korean Patent Application No. 10-2018-0157088, filed on Dec. 7, 2018, which is hereby incorporated by reference in its entirety.

TECHNICAL FIELD

The present invention relates to a battery module, and more particularly, to a battery module including a busbar assembly having a busbar and a busbar frame which are coupled to each other.

BACKGROUND ART

A rechargeable battery is easy to apply to products and has high electrical characteristics such as energy density. Therefore, the rechargeable battery is widely applied to electric power storage devices and electric or hybrid vehicles, driven by electrical driving sources, as well as portable devices. The rechargeable battery is considered as a new energy source for improving environmentally-friendly characteristics and energy efficiency because the rechargeable battery achieves a primary advantage of innovatively reducing the use of fossil fuel and generates no by-product even though energy is used.

A battery pack applied to the electric vehicle or the like has a structure in which multiple cell assemblies each including multiple unit cells are connected in series in order to obtain a high output. Further, the unit cell includes a positive electrode current collector, a negative electrode current collector, a separator, an active material, and an electrolyte. The unit cell may be repeatedly charged and discharged by means of electrochemical reactions between constituent elements.

Recently, the battery pack is required to be used as an energy storage source and needs to have a structure with a high capacity, as a result of which there is an increasing demand for a battery pack having a multi-module structure in which multiple battery modules are assembled and each have multiple rechargeable batteries connected in series and/or in parallel.

In order to make the battery pack by connecting the multiple battery cells in series/in parallel, the battery module having at least one battery cell is made first, and then the battery pack is made by using at least one battery module and adding other constituent elements. The number of battery modules included in the battery pack or the number of battery cells included in the battery module may be variously set depending on a required output voltage or a required charging/discharging capacity. The battery module configured in this manner includes multiple battery cells stacked on one another, and a busbar assembly configured to electrically connect electrode leads of the multiple battery cells.

Because a busbar is assembled and fixed to a busbar frame by thermal bonding in the related art, the busbar may deviate due to assembly tolerance, and there may be a lack of close-contact force. Accordingly, there is a need for a busbar assembly having a structure in which a busbar and a busbar frame are stably, securely, and tightly coupled.

DISCLOSURE

Technical Problem

The present invention has been made in an effort to provide a battery module including a busbar assembly in which a busbar and a busbar frame are integrally formed by insert injection molding, thereby providing a fixing structure in which a coupling force between the busbar and the busbar frame is enhanced.

However, the object to be achieved by the exemplary embodiments of the present invention is not limited to the above-mentioned object but may be variously expanded without departing from the technical spirit of the present invention.

Technical Solution

An exemplary embodiment of the present invention provides a battery module including a cell assembly including at least one battery cell, a module casing configured to accommodate the cell assembly, and a busbar assembly integrated by forming, by insert-injection molding, a busbar electrically connected to an electrode lead of the cell assembly, and a busbar frame configured to cover the cell assembly at least at one side.

The busbar may be made of metal, and the busbar frame may be made of insulating plastic.

The busbar frame may be raised along an edge of the busbar to surround the busbar at a lateral side of the busbar.

The busbar may further include at least one through hole so that a position fixing pin protruding in a mold during an insert-injection molding process is inserted into the through hole.

The through hole may be disposed at least at one of an upper end and a lower end of the busbar.

The through hole may be disposed adjacent to an edge of the busbar.

The busbar frame may further include a depressed portion adjoining an edge of the busbar where a grip portion protruding in a mold during an insert-injection molding process is positioned.

At least a pair of depressed portions may be disposed to adjoin edges of the busbars which face each other.

The busbar may further include at least one through hole so that a position fixing pin protruding in a mold during an insert-injection molding process is inserted into the through hole, and the busbar frame may further include a depressed portion adjoining an edge of the busbar where a grip portion protruding in the mold is positioned at a position different from the position of the position fixing pin during the insert-injection molding process.

The through hole of the busbar may be disposed at least at one of an upper end and a lower end of the busbar, and the depressed portion may be formed to adjoin the edge of the busbar which extends vertically.

Another exemplary embodiment of the present invention provides a battery pack including at least one battery module, and a pack casing configured to package at least one battery module.

Still another exemplary embodiment of the present invention provides a device including at least one battery pack.

Advantageous Effect

According to the exemplary embodiment, the busbar assembly is manufactured by insert-injection molding, and the battery module is assembled by using the busbar assembly, such that the busbar and the busbar frame, which are made of different types of materials, may be tightly joined and fixed. Accordingly, it is possible to prevent the busbar from swaying due to assembly tolerance or to prevent the coupled state from being loosened.

MODE FOR INVENTION

Hereinafter, several exemplary embodiments of the present invention will be described in detail with reference to the accompanying drawings so that those with ordinary skill in the art to which the present invention pertains may easily carry out the exemplary embodiments. The present invention may be implemented in various different ways and is not limited to the exemplary embodiments described herein.

Throughout the specification, unless explicitly described to the contrary, the word "comprise/include" and variations such as "comprises/includes" or "comprising/including" will be understood to imply the inclusion of stated elements, not the exclusion of any other elements.

Throughout the specification, the word "in a plan view" means when an object is viewed from above, and the word "in a cross-sectional view" means when a cross section made by vertically cutting an object is viewed from a lateral side.

Figure 1:
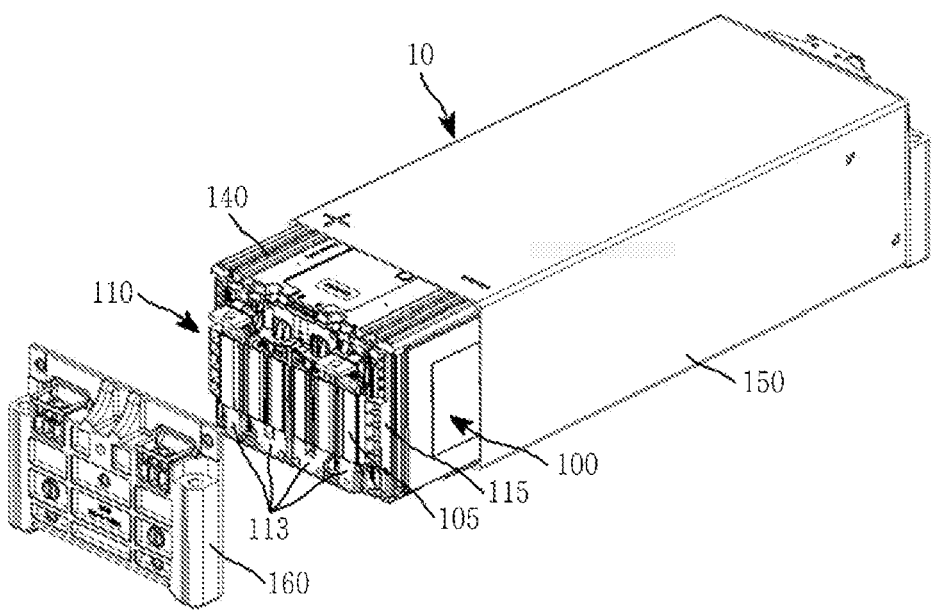
FIG. 1 is a partially exploded perspective view illustrating a battery module according to an exemplary embodiment of the present invention.

FIG. 1 is a partially exploded perspective view illustrating a battery module according to an exemplary embodiment of the present invention.

Referring to FIG. 1, a battery module 10 includes a cell assembly 100, a module casing 150 configured to accommodate the cell assembly 100, and a busbar assembly 110 configured to cover at least one side of the cell assembly 100. Further, the battery module 10 may have an insulating frame 160 provided at a side of the module casing 150 and configured to cover the busbar assembly 110.

The cell assembly 100 has multiple battery cells. As an example, the cell assembly 100 may be configured as a pouch-type rechargeable battery. The stacked multiple battery cells are included in the cell assembly 100 and may be electrically connected to one another. Each of the battery cells may include an electrode assembly, a battery casing configured to accommodate the electrode assembly, and electrode leads 105 protruding to the outside of the battery casing and electrically connected to the electrode assembly. The electrode assembly may include a positive electrode plate, a negative electrode plate, and a separator. Because an electrode assembly having a publicly known structure may be adopted, a detailed description thereof will be omitted.

The module casing 150 defines an external appearance of the battery module 10. The busbar assembly 110 is coupled to at least one side or both sides where the electrode leads 105 of the cell assembly 100 accommodated in the module casing 150 are extended. The insulating frame 160 may be coupled to an outer side of the busbar assembly 110. The busbar assembly 110 may include a busbar frame 115 disposed to cover the cell assembly 100, and busbars 113 fixed to the busbar frame 115. The busbar frame 115 is made of an insulator and includes lead slots through which the electrode leads 105 extended from the cell assembly 100 may pass. The busbars 113 may electrically connect the electrode leads 105 of the cell assembly 100.

The busbar assembly 110 may further include various types of electric components. As an example, the busbar assembly 110 may have an internal circuit board (ICB), a battery management system (BMS), and the like. The electric components such as the ICB and the BMS may be electrically connected to the multiple battery cells.

Figure 2:
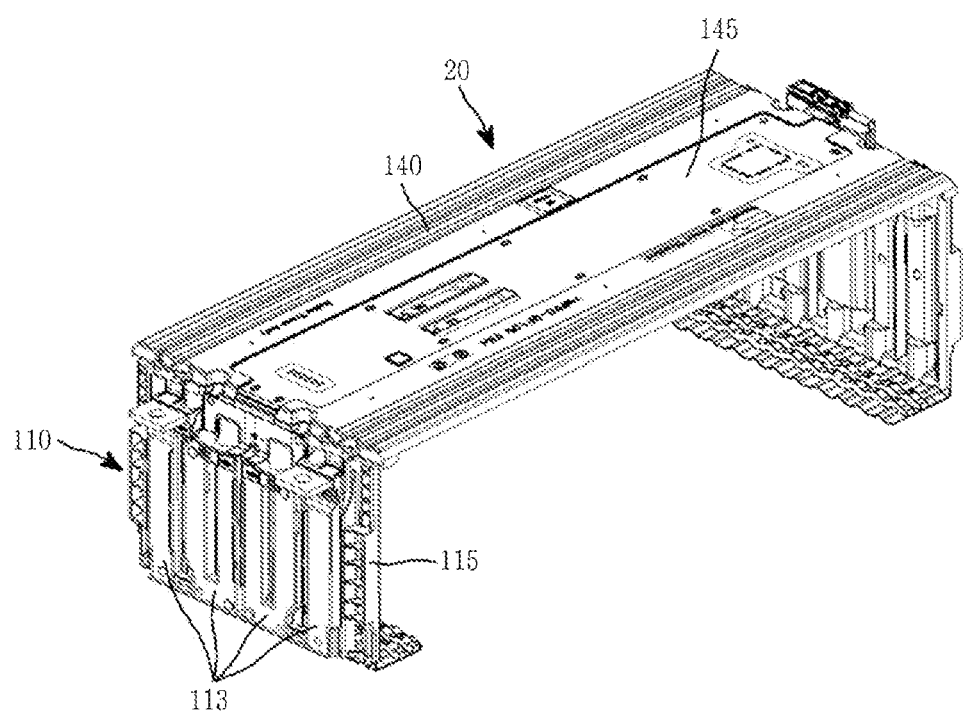
FIG. 2 is a perspective view illustrating a frame assembly including a busbar assembly of the battery module illustrated in FIG. 1.

FIG. 2 is a perspective view illustrating a frame assembly 20 including the busbar assembly 110 of the battery module illustrated in FIG. 1.

Referring to FIG. 2, the frame assembly 20 may include a main frame 140, and busbar frames 115 provided at both sides of the main frame 140 and each having an edge rotatably coupled to the main frame 140. In this case, the busbars 113 are mounted on the busbar frame 115 to define the busbar assembly 110. A flexible printed circuit board (FPCB) 145 may be disposed at an upper end of the main frame 140 in a longitudinal direction of the main frame 140.

The flexible printed circuit board 145 is electrically connected to the busbars 113 and thus may detect an overvoltage and an overcurrent of the battery cell. A connector connected to one end of the flexible printed circuit board 145 may transmit and receive signals related to voltage sensing and temperature sensing to/from a controller provided outside the battery module 10. The cell assembly 100 is surrounded by the frame assembly 20 and accommodated in the module casing 150. Therefore, the interior of the cell assembly 100 may be protected as the impact applied to the battery cells in case of external impact is attenuated.

In the present exemplary embodiment, the busbars 113 and the busbar frame 115, which constitute the busbar assembly 110, may be integrally formed by insert-injection molding. The insert-injection molding refers to a method of inserting a completely molded primary product (e.g., the busbar) into a mold (e.g., a busbar frame mold) and performing injection molding. The insert-injection molding may manufacture an integrated component (i.e., the busbar assembly) by using components made of different types of materials. The busbar 113 is made of metal, and the busbar frame 115 is made of non-conductive plastic. The busbar assembly 110, in which the busbars 113 and the busbar frame 115 are integrally formed, may be manufactured by the insert-injection molding.

In the busbar assembly in the related art, the busbar and the busbar frame may be manufactured as separate components and then assembled together. The busbars made of metal are preliminary and primarily fixed to the busbar frame made of non-conductive plastic, and then the busbars and the busbar frame are joined to one another by thermal bonding. That is, the structure coupled to the busbars may be formed by heating and deforming a part of the busbar frame. In the case in which the busbar assembly is formed as described above, the busbars and the busbar frame are fixed and supported only at the portions subjected to the thermal bonding, as a result of which it may be difficult to maintain a state in which the busbars and the busbar frame are entirely and securely coupled to one another. In contrast, the busbar assembly 110 integrally formed by insert-injection molding may prevent the above-mentioned problem.

Figure 3:
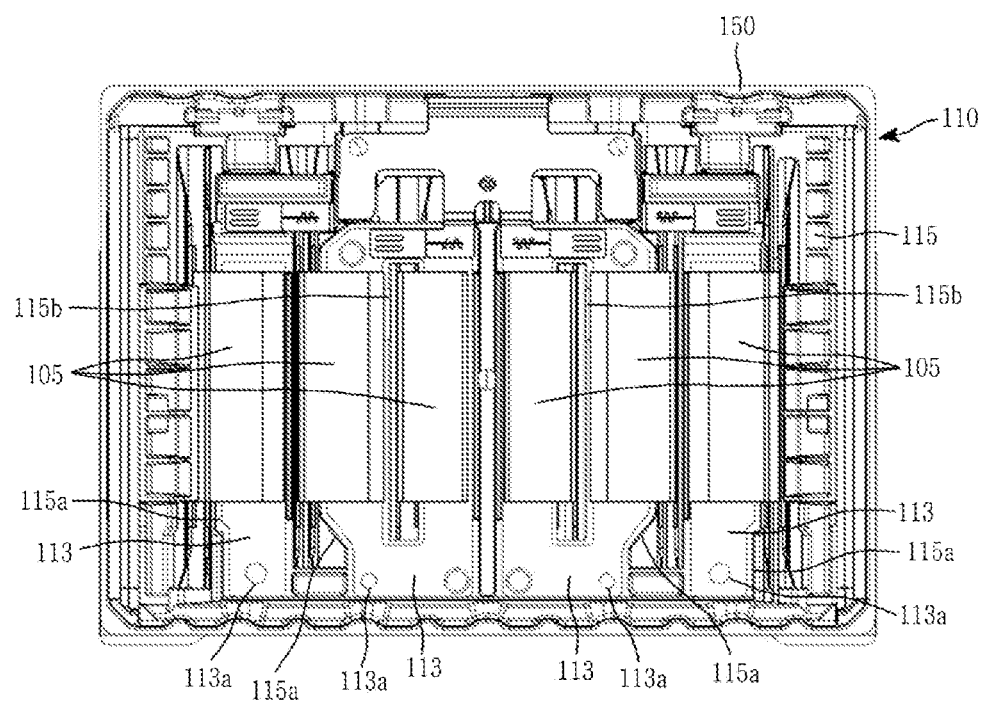
FIG. 3 is a front view illustrating a state in which electrode leads are connected to the busbar assembly of the battery module illustrated in FIG. 1.

FIG. 3 is a front view illustrating a state in which the electrode leads 105 are connected to the busbar assembly 110 of the battery module illustrated in FIG. 1.

Referring to FIG. 3, the busbars 113 made of metal are electrically connected to the electrode leads 105, and the busbar frame 115 made of non-conductive plastic may cover the cell assembly 100 at least at one side of the module casing 150. In this case, the busbar frame 115 has the lead slots, such that the electrode leads 105 extended from the cell assembly 100 may pass the lead slots and then may be joined to the busbars 113.

In the busbar assembly 110 manufactured by the insert-injection molding as described above, the busbars 113 and the busbar frame 115 may be tightly coupled to one another even though the busbars 113 and the busbar frame 115 are made of different types of materials. The busbar assembly 110 according to the present exemplary embodiment may further include a configuration capable of reinforcing the structure in which the busbars 113 are fixed to the busbar frame 115.

That is, as illustrated in FIG. 3, the busbar frame 115 may be raised along edges of the busbars 113 to surround the lateral sides of the busbars 113. The portions of the busbar frame 115, which are raised along the edges of the busbars 113, may define rim portions 115a and accommodate the busbars 113 inside the rim portions 115a. Therefore, the busbar frame 115 may surround a lateral surface of the busbar 113 as well as a main surface of the busbar 113 facing the busbar frame 115. The rim portion 115a of the busbar frame 115 may have a height equal in level to a surface of the busbar 113. In other words, the remaining surfaces of the busbar 113, except for the surfaces joined to the electrode leads 105, may adjoin and be coupled to the busbar frame 115.

In addition, each of the busbars 113 may include a through hole 113a, and the busbar frame 115 may include grooves corresponding to the through holes 113a of the busbars 113. As an example, the through hole 113a is disposed at a lower end of the busbar 113. The through hole 113a may be disposed adjacent to the edge of the busbar 113 at the lower end of the busbar 113. As another example, the through holes may be disposed adjacent to edges of the upper and lower ends of the busbar 113. Referring to FIG. 3, if two types of busbars 113 are four in number, the through holes 113a may be formed in the four busbars 113, one through hole 113a for each busbar 113. As another example, two or more through holes 113a may be formed in each of the busbars 113.

Since the busbars 113 and the busbar frame 115 are integrally formed by the insert-injection molding as described above, pins for fixing the positions of the busbars 113 in the mold may be inserted into the through holes 113a of the busbars 113 during the insert-injection molding process. If the position fixing pin has a size larger than a thickness of the busbar 113, the position fixing pin may form the groove in the busbar frame 115 of the final product while being inserted into the through hole 113a. However, if the position fixing pin has a size smaller than the thickness of the busbar 113, the groove may not be formed. The through hole 113a of the busbar 113 may vary in size depending on a shape or an area of the busbar 113 and may have a circular cross section in a plan view.

The busbar frame 115 of the busbar assembly 110 according to the present exemplary embodiment may further include depressed portions 115b each of which is positioned adjacent to the edge of the busbar 113. While the busbars 113 and the busbar frame 115 are manufactured by insert-injection molding, grip portions may protrude so as to adjoin the edges of the busbars 113 in the mold. The pair of grip portions may be formed at the edges of the busbars 113 which extend vertically and face each other. The grip portions formed in the insert-injection mold, together with the position fixing pins, may fix the busbars 113 at exact positions and prevent the busbars 113 from moving in the mold during the process. Since the pair of grip portions is formed at the edges of the busbars 113 facing each other, it is possible to prevent the busbars 113 from moving in a left-right direction (left-right direction parallel to the main surface of the busbar). As the grip portions are positioned in the mold in this manner, the depressed portions 115b corresponding to the grip portions may be formed in the busbar frame 115 of the final product.

Figure 4:
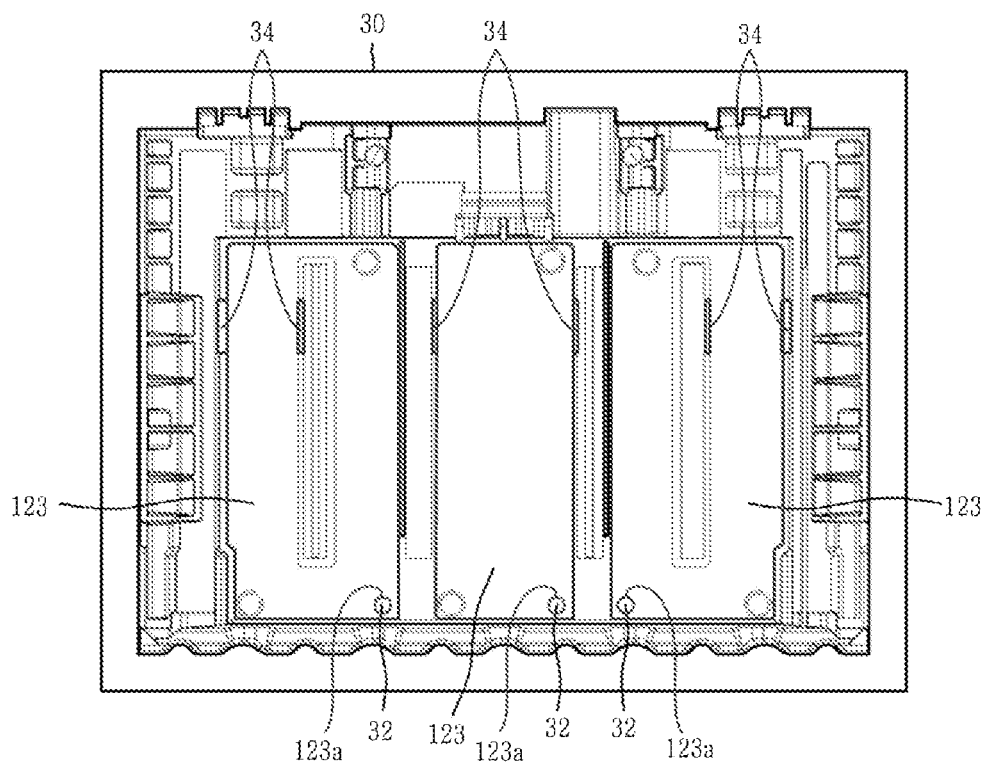
FIG. 4 is a front view schematically illustrating a state in which busbars are inserted into an insert-injection mold used to manufacture a busbar assembly according to another exemplary embodiment of the present invention.

FIG. 4 is a front view schematically illustrating a state in which busbars 123 are inserted into an insert-injection mold 30 configured to manufacture a busbar assembly according to another exemplary embodiment of the present invention.

Referring to FIG. 4, the mold 30 has a region in which the busbars 123, together with a frame for molding the busbar frame, may be seated and fixed. Position fixing pins 32 for fixing the positions of the busbars 123 protrude in the region in which the busbars are seated. The position fixing pin 32 may have a circular cross section in a plan view. Through holes 123a may be formed in the busbars 123 so that the position fixing pins 32 may penetrate the through holes 123a.

In addition, grip portions 34 protrude in the mold 30 in order to restrict the motion of the busbars 123 during the insert-injection molding process. The grip portion 34 is configured as a thin and long piece and protrudes such that the grip portion 34 may be positioned to adjoin the edge of the busbar 123 which extends vertically. The pair of grip portions may be disposed to adjoin the edges of the busbars 123 facing each other, thereby effectively restricting the left and right movements of the busbars 123.

Figure 5:
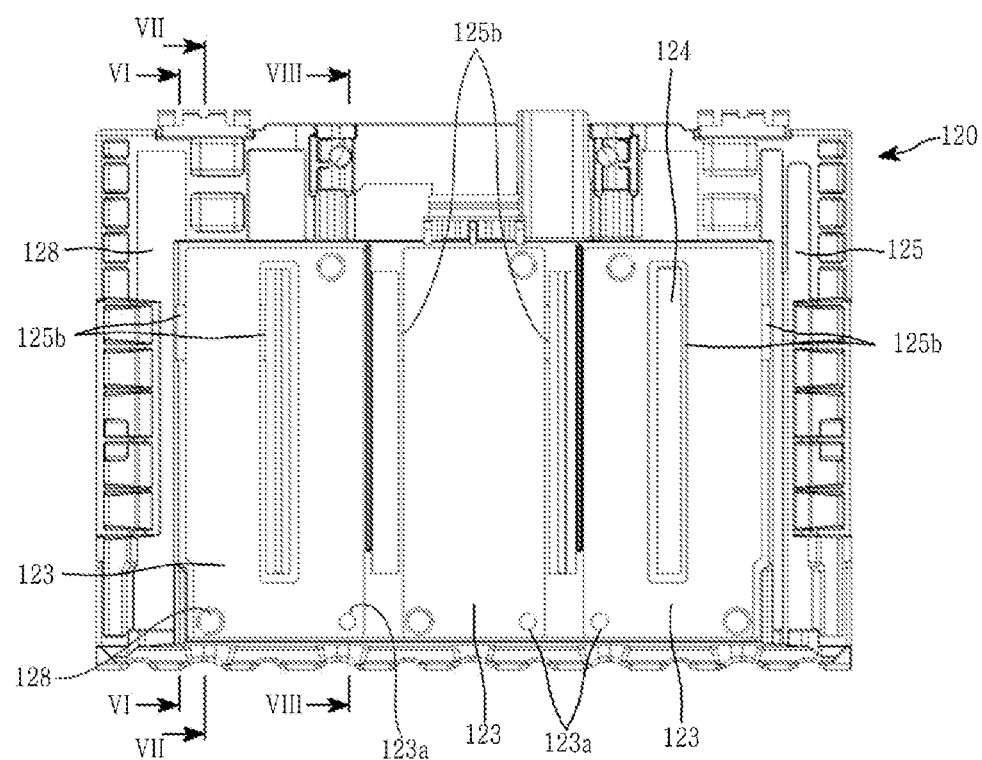
FIG. 5 is a front view illustrating a busbar assembly according to still another exemplary embodiment of the present invention.
Figure 6:
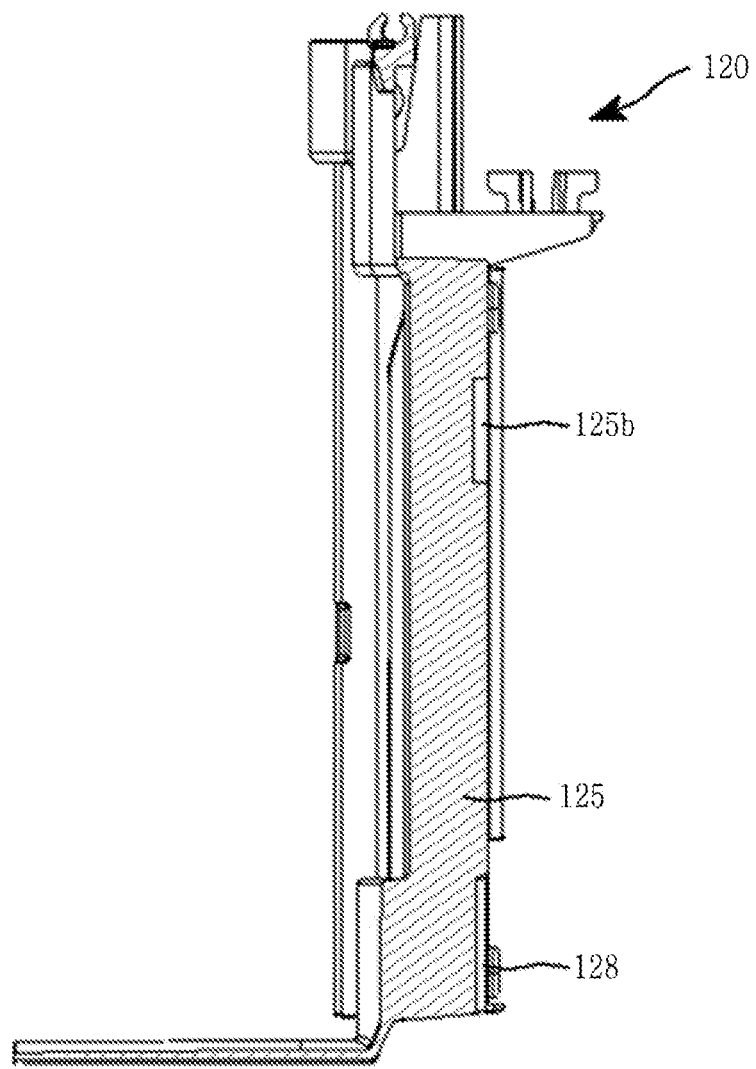
FIG. 6 is a cross-sectional view taken along line VI-VI in FIG. 5.
Figure 7:
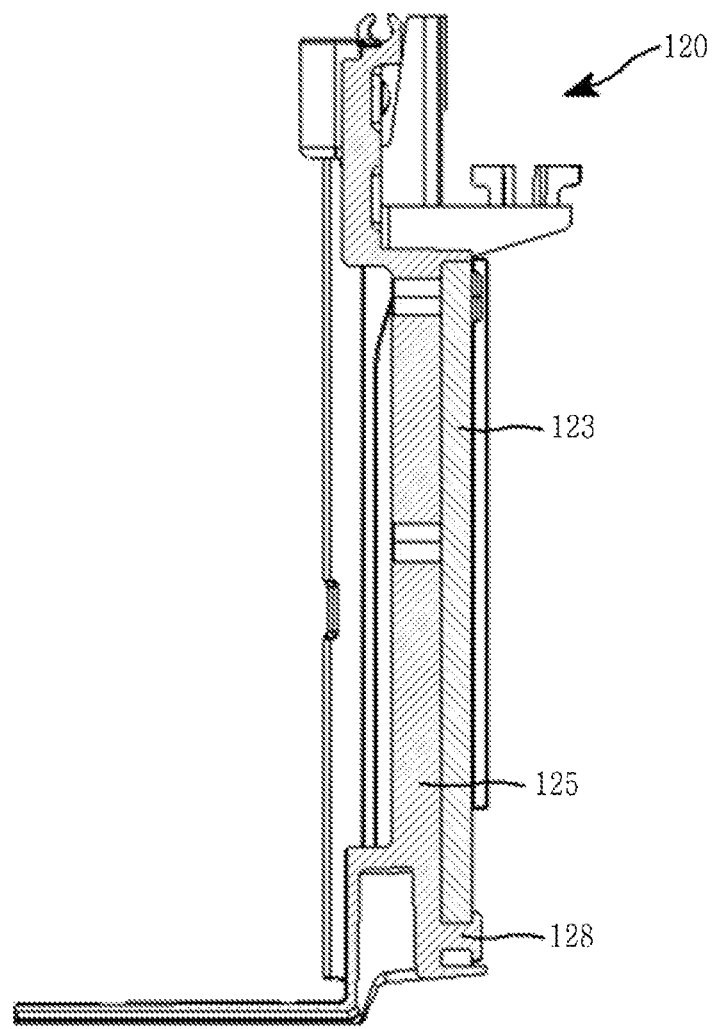
FIG. 7 is a cross-sectional view taken along line VII-VII in FIG. 5.
Figure 8:
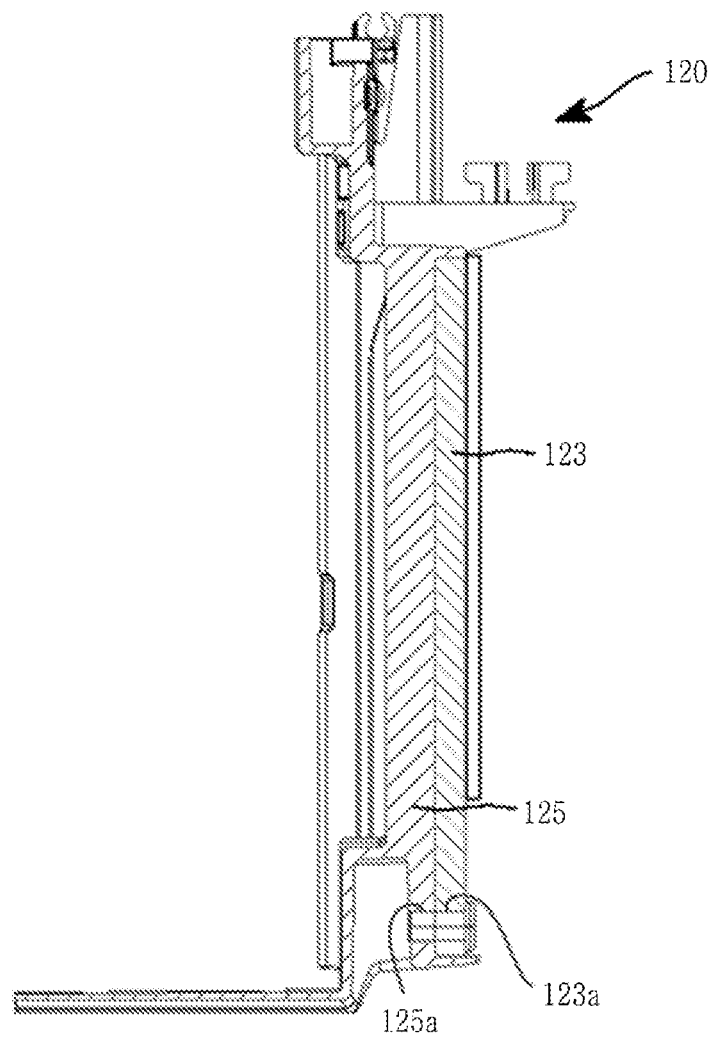
FIG. 8 is a cross-sectional view taken along line VIII-VIII in FIG. 5.

FIG. 5 is a front view illustrating a busbar assembly according to still another exemplary embodiment of the present invention, FIG. 6 is a cross-sectional view taken along line VI-VI in FIG. 5, FIG. 7 is a cross-sectional view taken along line VII-VII in FIG. 5, and FIG. 8 is a cross-sectional view taken along line VIII-VIII in FIG. 5.

Referring to FIG. 5, a busbar assembly 120 according to the present exemplary embodiment has two types of busbars 123 which are three in number. That is, the busbars 123 include the busbars 123 disposed at both sides and each having a lead slot 124 at a center thereof, and the busbar 123 disposed at a center and having no lead slot. In the busbar assembly 120 formed in this manner, the busbars 123 and a busbar frame 125 may be integrally formed by insert-injection molding. In this case, each of the busbars 123 may include a through hole 123a, and the busbar frame 125 may include grooves corresponding to the through holes 123a of the busbars 123.

In addition, referring to FIGS. 5 and 6, the busbar frame 125 of the busbar assembly 120 according to the present exemplary embodiment may further include depressed portions 125b each of which is positioned adjacent to the edge of the busbar 123 which extends vertically. As illustrated in FIG. 4, while the busbars 123 and the busbar frame 125 are manufactured by insert-injection molding, the grip portions 34 may protrude so as to adjoin the edges of the busbars 123 in the mold 30. The pair of grip portions 34 may be formed to adjoin the edges of the busbars 123 which extend vertically and face each other. The grip portions 34 formed in the insert-injection mold 30, together with the position fixing pins 32, may fix the busbars 123 at exact positions and prevent the busbars 123 from moving in the mold 30 during the process. Since the pair of grip portions 34 is formed at the edges of the busbars 123 facing each other, it is possible to prevent the busbars 123 from moving in a left-right direction (left-right direction parallel to the main surface of the busbar). As the grip portions 34 are positioned in the mold 30 in this manner, the depressed portions 125b corresponding to the grip portions 34 may be formed in the busbar frame 125 of the final product.

Referring to FIGS. 5 and 7 together, the busbar assembly 120 according to the present exemplary embodiment may further include fixing pin portions 128 configured to couple and fix the busbars 123 and the busbar frame 125. Referring to FIG. 7, the fixing pin portion 128 may protrude to the outside of the busbar 123 as a material constituting the busbar frame 125 penetrates the busbar 173. The fixing pin portion 128 defines a head expanding outward, such that the busbar 123 and the busbar frame 125 may be securely fixed to each other. That is, the fixing pin portion 128 may be formed integrally with the busbar frame 125.

Referring to FIGS. 5 and 8 together, the through holes 123a are formed in the busbar 123 according to the present exemplary embodiment, and the grooves 125a corresponding to the through holes 123a are formed in the busbar frame 125. That is, as described with reference to FIG. 4, the through holes 123a are formed in the busbars 123 so that the position fixing pins 32 formed in the mold during the insert-injection molding process are inserted into the through holes 123a. Therefore, the grooves 125a may also be formed in the busbar frame 125.

Figure 9:
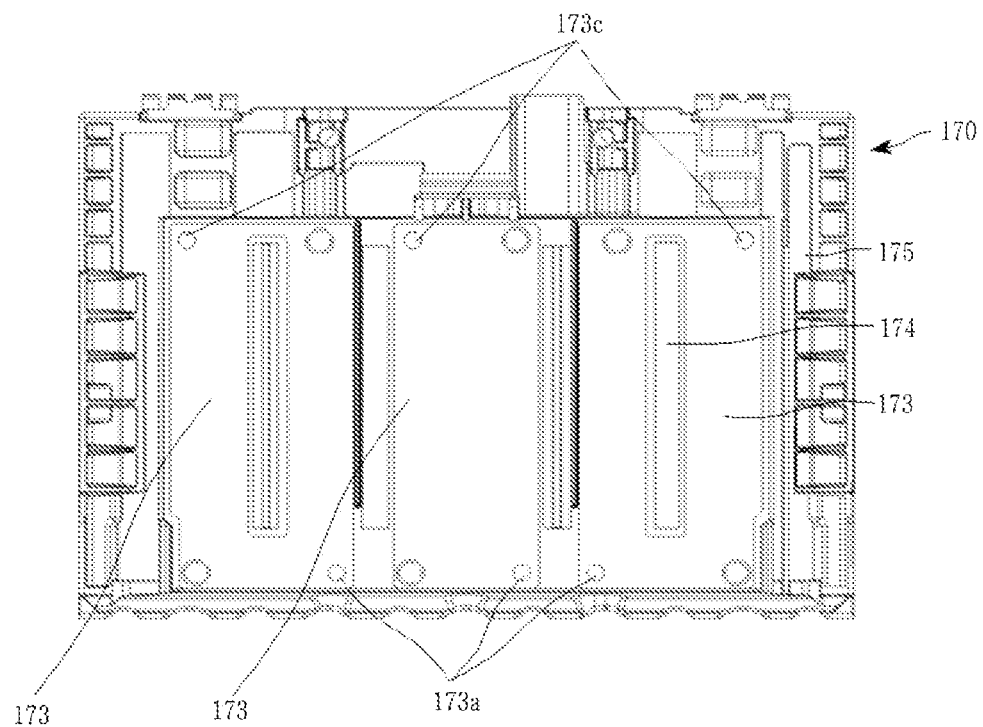
FIG. 9 is a front view illustrating a busbar assembly according to yet another exemplary embodiment of the present invention.

FIG. 9 is a front view illustrating a busbar assembly 170 according to yet another exemplary embodiment of the present invention.

The busbar assembly 170 according to the present exemplary embodiment has two types of busbars 173 which are three in number. That is, the busbars 173 include the busbars 173 disposed at both sides and each having a lead slot 174 at a center thereof, and the busbar 173 disposed at a center and having no lead slot. In the busbar assembly 170 formed in this manner, the busbars 173 and a busbar frame 175 may be integrally formed by insert-injection molding. In this case, each of the busbars 173 may include through holes 173a and 173c, and the busbar frame 175 may include grooves corresponding to the through holes 173a and 173c of the busbar 173.

In the present exemplary embodiment, the through holes 173a and 173c are formed at upper and lower ends of the busbar 173. That is, the through hole 173c may be formed at the upper end positioned on a diagonal line from the through hole 173a formed at the lower end of each of the busbars 173. Therefore, it is possible to restrict the left and right motion of the busbar 173 by forming the multiple position fixing pins without forming the grip portion during the insert-injection molding process.

A comparative example in which a busbar and a busbar frame are not integrally manufactured by insert-injection molding may be considered in comparison with the battery module according to the exemplary embodiment. In the comparative example, the busbar and the busbar frame may be separately manufactured and then coupled to each other by means of a fastening member. In the battery module formed as described above, the busbar may sway or the coupled state may be loosened due to assembly tolerance between the busbar and the busbar frame. In addition, when the battery module is applied to a vehicle or the like and the fastened portion is consistently exposed to vibration, the fastened portion may be loosened, and the electrical connection may be affected.

In contrast, in the case in which the busbars and the busbar frame are coupled and the busbar assembly is integrally formed by insert-injection molding in accordance with the present exemplary embodiment, the coupling may be completed at the same time as the injection molding. Therefore, it is possible to avoid the problem that occurs in the comparative example.

Meanwhile, one or more battery modules according to the exemplary embodiment of the present invention are packaged in a pack casing, such that a battery pack may be formed.

The above-mentioned battery module and the battery pack including the battery module may be applied to various devices. The device may be applied to transportation means such as an electric bicycle, an electric vehicle, and a hybrid vehicle, but the present invention is not limited thereto, and the transportation means may be applied to various devices that may use the battery module and the battery pack including the battery module. These configurations may also belong to the scope of the present invention.

Although preferred examples of the present invention have been described in detail hereinabove, the right scope of the present invention is not limited thereto, and it should be clearly understood that many variations and modifications of those skilled in the art using the basic concept of the present invention, which is defined in the following claims, will also belong to the right scope of the present invention.

<Description of symbols>

| | |
|---|---|
| 10: Battery module | 20: Frame assembly |
| 30: Insert-injection mold | 32: Position fixing pin |
| 34: Grip portion | 100: Cell assembly |
| 105: Electrode lead | 110, 120, 170: Busbar assembly |
| 113, 123, 173: Busbar | |
| 113a, 123a, 173a, 173c: Through hole | |
| 115, 125, 175: Busbar frame | |
| 115a: Rim portion | 115b, 125b: Depressed portion |
| 124: Lead slot | 128: Fixing pin portion |
| 140: Main frame | 145: Flexible printed circuit board |
| 150: Module casing | 160: Insulating frame |

The invention claimed is:

1. A battery module comprising:
a cell assembly comprising at least one battery cell;
a module casing configured to accommodate the cell assembly;
a busbar electrically connected to an electrode lead of the cell assembly, and
a busbar frame configured to cover the cell assembly at least at one side thereof, wherein the busbar and the busbar frame are formed integrally by insert-injection molding, wherein the busbar frame further comprises at least a pair of depressed portions each adjoining an edge of the busbar where a grip portion protruding in a mold during an insert-injection molding process is positioned, the depressed portions are each formed to adjoin the edge of the busbar which extends vertically.

2. The battery module of claim 1, wherein:
the busbar is made of metal, and the busbar frame is made of insulating plastic.

3. The battery module of claim 1, wherein:
the busbar frame is raised along an edge of the busbar to surround the busbar at a lateral side of the busbar.

4. The battery module of claim 1, wherein:
the busbar further comprises at least one through hole so that a position fixing pin protruding in the mold during the insert-injection molding process is inserted into one of the at least one through hole.

5. The battery module of claim 4, wherein:
the at least one through hole is disposed at least at one of an upper end and a lower end of the busbar.

6. The battery module of claim 4, wherein:
the at least one through hole is disposed adjacent to an edge of the busbar.

7. The battery module of claim 1, wherein:
the depressed portions are disposed to adjoin edges of the busbars which face each other.

8. The battery module of claim 4, wherein:
the grip portion protruding in the mold is positioned at a position different from a position of the position fixing pin during the insert-injection molding process.

9. The battery module of claim 8, wherein:
the at least one through hole of the busbar is disposed at least at one of an upper end and a lower end of the busbar.

10. A battery pack comprising:
at least one battery module according to claim 1; and
a pack casing configured to package the at least one battery module.

11. A device comprising: at least one battery pack according to claim 10.

12. A battery module comprising:
a cell assembly comprising at least one battery cell;
a module casing configured to accommodate the cell assembly;
a busbar electrically connected to an electrode lead of the cell assembly, and
a busbar frame configured to cover the cell assembly at least at one side thereof,
wherein the busbar and the busbar frame are formed integrally by insert-injection molding,
wherein the busbar further comprises at least one through hole so that a position fixing pin protruding in a mold during an insert-injection molding process is inserted into one of the at least one through hole, and the busbar frame further comprises a depressed portion adjoining an edge of the busbar where a grip portion protruding in the mold is positioned at a position different from the position of the position fixing pin during the insert-injection molding process, and
wherein the at least one through hole of the busbar is disposed at least at one of an upper end and a lower end of the busbar, and the depressed portion is formed to adjoin the edge of the busbar which extends vertically.

13. The battery module of claim 12, wherein:
the busbar is made of metal, and the busbar frame is made of insulating plastic.

14. The battery module of claim 12, wherein:
the busbar frame is raised along an edge of the busbar to surround the busbar at a lateral side of the busbar.

15. A battery pack comprising:
at least one battery module according to claim 12; and
a pack casing configured to package the at least one battery module.

16. A device comprising: at least one battery pack according to claim 15.

* * * * *